United States Patent [19]

Chiloyan et al.

[11] Patent Number: 5,986,623
[45] Date of Patent: Nov. 16, 1999

[54] SYSTEM AND METHOD FOR INTERLACED DISPLAY DEVICE DATA TRANSMISSION

[75] Inventors: John H. Chiloyan, Redmond, Wash.; John E. Morrow, Fremont, Nebr.

[73] Assignee: Microsoft Corporation, Redmond, Wash.

[21] Appl. No.: 08/794,682

[22] Filed: Feb. 3, 1997

[51] Int. Cl.[6] .................................................. G09G 1/08
[52] U.S. Cl. ........................... 345/13; 348/305; 348/550; 364/705.07
[58] Field of Search ............................. 345/13; 348/305, 348/550; 364/705.07, 705.01

[56] References Cited

U.S. PATENT DOCUMENTS

| | | | |
|---|---|---|---|
| 3,848,082 | 11/1974 | Summers | 348/473 |
| 4,106,283 | 8/1978 | Yamashita | 348/790 |
| 4,807,031 | 2/1989 | Broughton et al. | 348/460 |
| 5,073,931 | 12/1991 | Audebert et al. | 380/23 |
| 5,488,571 | 1/1996 | Jacobs et al. | 708/111 |
| 5,663,766 | 9/1997 | Sizer, II | 348/473 |
| 5,777,950 | 11/1996 | Helm et al. | 368/47 |
| 5,835,388 | 11/1998 | Helm | 364/705.07 |

OTHER PUBLICATIONS

U.S. Patent Application Serial No. 08/394,659 entitled "System and Method for Remotely Managing Memory In A Portable Information Device From An External Computer," inventors Vinay Deo and Neil S. Fishman, filed Feb. 2, 1995.

U.S. Patent Application Serial No. 08/428,917 entitled "System and Method for Remotely Programming A Portable Information Device Using Optical Serial Data Transmission From A Frame–Scanning Graphics Display Device," inventors Victor Shiff, Neil S. Fishman, and Philip Brzezinski, filed Apr. 25, 1995.

*Primary Examiner*—Bipin H. Shalwala
*Assistant Examiner*—Ricardo Osorio
*Attorney, Agent, or Firm*—Jones & Askew, LLP

[57] ABSTRACT

A system and method for optically, serially transmitting data to a remote device using an interlaced display device. The data bits to be transmitted are ordered so that the bits are received in proper temporal order by the remote device. At least one of the data bits can be transmitted using the even-numbered horizontal scan lines of the interlaced display device. If all of the data bits can not be transmitted using the even-numbered horizontal scan lines of a usable transmission area, then at least one of the data bits can be transmitted using the odd-numbered horizontal scan lines of the interlaced display device. The binary data bits can be represented by illuminated and non-illuminated horizontal scan lines. An optical detector in the remote device can be used to receive the pulses of light, representing the data bits to be transmitted, from the horizontal scan lines.

20 Claims, 3 Drawing Sheets

SYSTEM AND METHOD FOR INTERLACED DISPLAY DEVICE DATA TRANSMISSION

TECHNICAL FIELD

The present invention relates to a system and method for optically transmitting data, and more particularly relates to a system and method for optically transmitting data to a remote device using a display device operating in interlaced mode.

BACKGROUND OF THE INVENTION

Information is vital in today's fast-paced world. The plethora of information, such as phone numbers, fax numbers, birthdays, anniversaries, and e-mail addresses, can be overwhelming. Many people use calculator-sized personal information managers to help them organize information that is important to them. Personal information managers can be used to store and access the information that people desire to have at their fingertips.

Although calculator-sized personal information managers are widely popular, their size and shape often make them inconvenient to transport from place to place and easy to misplace. Therefore, a personal information manager, incorporated into a wristwatch, has been developed that is more convenient to transport than a calculator-sized personal information manager. However, one problem encountered in the development of wristwatch personal information managers was the entry of information. A calculator-sized personal information manager usually has a keyboard to enter information into the device. However, a wristwatch personal information manager that includes a keyboard is either too large to wear comfortably or has keys so small that it is difficult to depress the keys to enter information into the wristwatch. Therefore, systems for transmitting information to the wristwatch personal information manager that do not require a keyboard were developed.

One known system for transmitting information to a wristwatch personal information manager is the "DATALINK" wristwatch personal information manager system from Timex Corporation of Middlebury, Conn. In the "DATALINK" system, a program module running on a personal computer includes information such as appointments, phone numbers, etc. The program module can be used to download the information from the program module to a wristwatch personal information manager so that this information can be accessed when the user is away from his personal computer. To download information, the wristwatch personal information manager has an optical sensor that receives a serial bit transmission in the form of light pulses at a fixed bit rate from the monitor of the personal computer.

To facilitate an understanding of data transmission in the "DATALINK" system, the basic operation of a display device will be described below. A display device, such as a cathode ray tube (CRT), typically includes an electron gun and a screen. The screen of the display device includes horizontal rows of pixels. To display the pixels and, in turn, an image, an electron beam from the electron gun individually illuminates phosphors coating the inside of the screen by scanning the horizontal rows of pixels. There are two different types of well-known display devices, noninterlaced and interlaced.

In a noninterlaced display device, the electron beam scans each horizontal scan line of the screen once during each sweep of the screen. Each sweep of the screen is known as a display frame, a refresh cycle, a field, or generating a raster image. Noninterlaced display devices effectively operate on every pixel on each horizontal scan line of the screen as the electron beam sweeps across and down the inner surface of the screen. For example, for a 60 Hertz noninterlaced display device, every horizontal scan line of the screen is updated 60 times in a second.

In an interlaced raster display device, the electron beam updates, or refreshes, all odd-numbered scan lines in one sweep of the screen and all even-numbered scan lines in the next sweep of the screen, or vice versa. By refreshing alternate sets of lines on the display, interlacing halves the number of lines that must be updated in a single sweep of the screen and also halves the amount of information that must be carried by the display signal at any one time.

In the "DATALINK" system, the personal computer is programmed to display a sequence of display frames in which the horizontal scan lines represent individual bits of data to be transmitted. In this known system, an illuminated scan line represents a binary '0' and a non-illuminated scan line represents a binary '1'. To transmit data to the wristwatch personal information manager, the wristwatch is held near and facing the cathode ray tube. Each horizontal scan line appears as a pulse of a finite duration to an optical detector in the receiving wristwatch. Thus, data can be transmitted from the personal computer to the wristwatch personal information manager.

One drawback of the "DATALINK" system is that, when using a display device operating in interlaced mode, it is only possible to transmit on the even-numbered scan lines or odd-numbered scan lines, but not both. Thus, half of the scan lines of the display device operating in interlaced mode are not used to transmit data under the known methods. Therefore, there is a need in the art for a system that supports interlaced CRT data transmission in which both even-numbered and odd-numbered scan lines can be used to transmit data.

SUMMARY OF THE INVENTION

The present invention satisfies the above described needs by providing an improved system and method for transmitting data using a display device operating in interlaced mode.

Generally described, the present invention provides a method for transmitting data signals, such as data bits, from an interlaced display device to a remote device. The remote device includes an optical detector and is physically separated from the interlaced display device. Examples of a remote device include, but are not limited to, a wristwatch personal information manager or a universal remote control.

The data signals are ordered so that they will be received in proper temporal order by the remote device. The data signals can be ordered by defining a relationship of scan lines to values of data signals in a lookup table. The relationship is typically created in a lookup table stored in memory accessible by the interlaced display device prior to transmission. At least one of the data signals is transmitted during one of the even or odd scans. The remote device is typically held near and facing the interlaced display device so that the optical detector is able to receive the data signals as pulses of light from the horizontal scan lines of the interlaced display device.

For example, in one method in which transmission is started during even horizontal scanning, data signals are ordered for transmission by placing the data signals in a lookup table by assigning at least one of the even-numbered scan lines to one of the data signals. It is then determined whether there is another data signal intended for transmission. If so, it is determined whether there is another even-numbered scan line that has not yet been assigned for transmission of a data signal. If another even-numbered scan line is available, then the steps of assigning an even-numbered scan line to one of the data signals are repeated. If there is not another available even-numbered scan line, however, then at least one of the odd-numbered scan lines is assigned to one of the data signals. It is determined whether there is another data signal intended for transmission. If so, it is determined whether there is another odd-numbered scan line that has not yet been assigned for transmission of a data signal, and, if so, then the steps of assigning an odd-numbered scan line for transmission of one of the data signals are repeated. The ordering arrangement supports proper temporal reception of the data signals by the remote device.

The present invention also provides a computer system for transmitting data to a remote device comprising a processing unit (PU), an interlaced display device coupled to the processing unit (PU), and memory coupled to the PU for storing a program module. The PU is responsive to instructions from the program module and is operative to order the data signals, transmit at least one of the data signals using at least one of the even-numbered scan lines of the interlaced display device, and, if all of the data signals could not be transmitted using one display frame of even-numbered scan lines, then transmit at least one of the data signals using at least one of the odd-numbered scan lines of the interlaced display device.

In yet another aspect, the present invention provides a computer-readable medium on which is stored a computer program for transmitting data signals using an interlaced display device. The computer program includes instructions which, when executed by a computer, perform the step of ordering the data signals so that the data signals will be received temporally. The computer program further includes instructions which, when executed by a computer, perform the steps of transmitting at least one of the data signals using at least one of the even-numbered horizontal scan lines of the interlaced display device; and, if there are more data signals to transmit, then transmitting at least one of the data signals using at least one of the odd-numbered horizontal scan lines of the interlaced display device.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
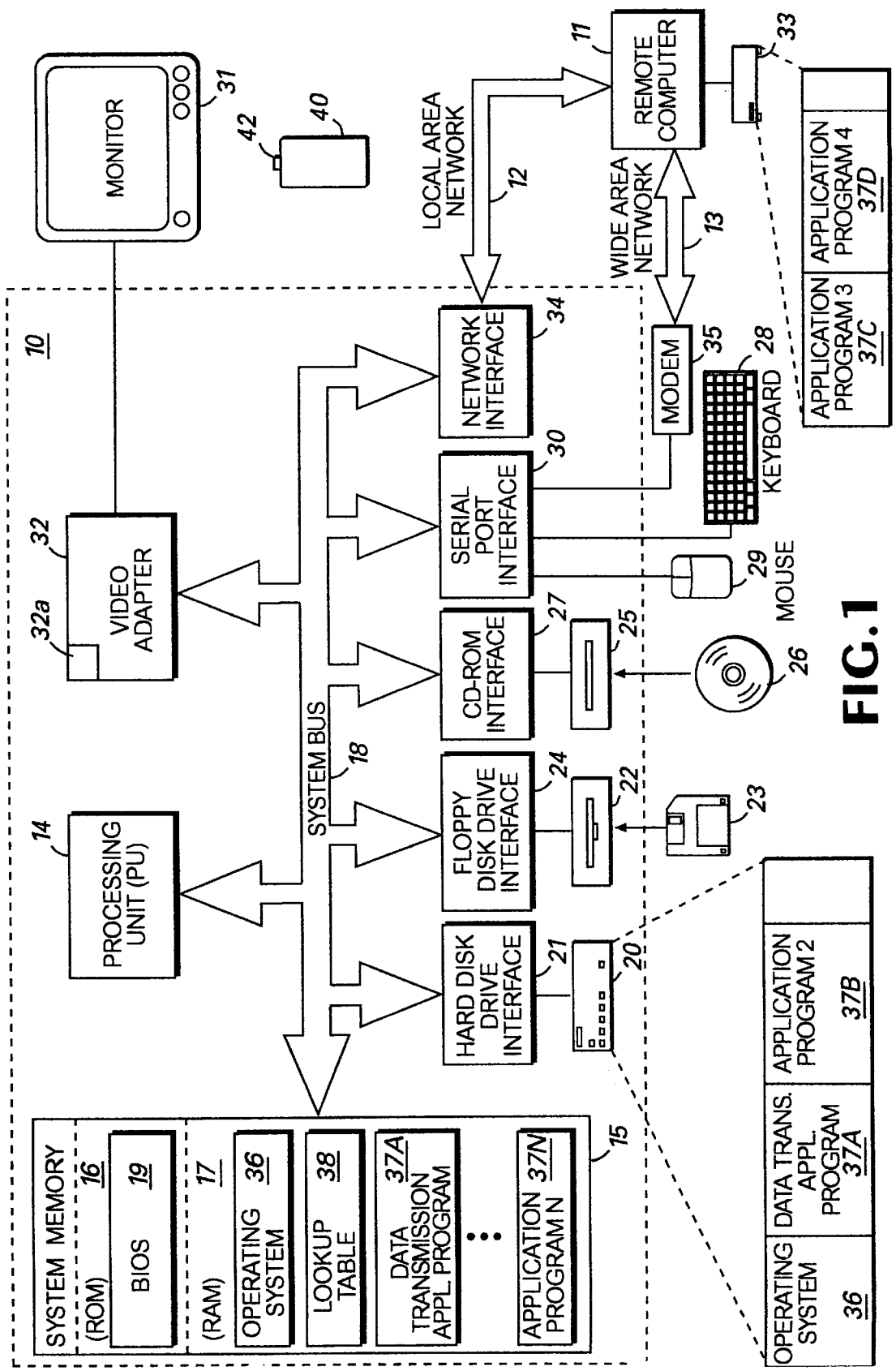
FIG. 1 is a block diagram of a personal computer that provides the operating environment for the preferred embodiment of the present invention.

The present invention is directed to a program module for optically transmitting data to a remote device using a display device operating in interlaced mode. Briefly described, the data signals to be transmitted are ordered so that the data signals are transmitted and received in proper temporal order. Illuminated and non-illuminated horizontal scan lines of the interlaced display device are used to represent binary ones and zeros. The data signals are serially transmitted on both the even-numbered and odd-numbered horizontal scan lines of the interlaced display device until all of the data signals have been transmitted. An optical sensor in a remote device receives the data signals in the form of pulses of light from the horizontal scan lines of the interlaced display device.

Although the preferred embodiment will be generally described in the context of a program and an operating system running on a personal computer, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a processing unit (PU), memory storage devices for the PU, display devices, and input devices. Furthermore, these processes and operations may utilize conventional computer components in a heterogeneous distributed computing environment, including remote file servers, remote compute servers, and remote memory storage devices. Each of these conventional distributed computing components is accessible by the PU via a communications network.

The processes and operations performed by the computer include the manipulation of signals by a PU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, data, objects, identifiers, values, elements, symbols, characters, terms, numbers, points, records, images, files or the like. It should be kept in mind, however, that these and similar terms should be assigned with appropriate physical quantities for computer operations, and that these terms are merely conventional labels applied to physical quantities that exist within and during operation of the computer.

It should also be understood that manipulations within the computer are often referred to in terms such as adding, comparing, receiving, sending, transmitting, etc., which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the preferred operating environment will be described.

The Operating Environment

FIG. 1 illustrates various aspects of the preferred computing environment in which the present invention is designed to operate. Those skilled in the art will immediately appreciate that FIG. 1 and the associated discussion are intended to provide a brief, general description of the preferred computer hardware and program modules, and that additional information is readily available in the appropriate programming manuals, user's guides, and similar publications.

FIG. 1 illustrates a conventional personal computer 10 suitable for supporting the operation of the preferred embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or compute server.

The personal computer 10 includes a processing unit (PU) 14, such as the 80486 or "PENTIUM" microprocessors manufactured by Intel Corporation of Santa Clara, Calif. The personal computer also includes system memory 15 (including read only memory (ROM) 16 and random access memory (RAM) 17), which is connected to the PU 14 by a system bus 18. The personal computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the personal computer 10 by using input devices, such as a keyboard 28 and/or pointing device, such as a mouse 29, which are connected to the system bus 18 via a serial port interface 30. Alternatively, the keyboard 28 may be connected to the system bus 18 via a keyboard interface (not shown in FIG. 1). Other types of pointing devices (not shown in FIG. 1) include track pads, track balls, pens, head trackers, data gloves and other devices suitable for positioning a cursor on an interlaced display device 31. The interlaced display device 31 is connected to the system bus 18 via a video adapter 32. The video adapter 32 includes video memory 32a.

The remote computer 11 in this networked environment is connected to a remote memory storage device 33. This remote memory storage device 33 is typically a large capacity device such as a hard disk drive, CD-ROM drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art will quickly recognize that the modem 35 may also be internal to the personal computer 10, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, application programs 37, including data transmission application program 37a, and data are provided to the personal computer 10 via computer-readable media. In the preferred computer, the computer-readable media include the local or remote memory storage devices, which may include the ROM 16, RAM 17, local hard disk drive 20, floppy disk 23, CD-ROM 26, and the remote memory storage device 33. In the preferred personal computer 10, the local hard disk drive 20 is used to store data and programs, including the operating system and programs.

When the personal computer 10 is turned on or reset, the Basic Input/Output System (BIOS) 19, which is stored in the ROM 16, instructs the PU 14 to load the operating system 36 from the hard drive 20 into the RAM 17. Once the operating system 36 is loaded into RAM 17, the PU 14 executes the operating system 36 and causes the visual elements associated with the user interface of the operating system 36 to be displayed on the interlaced display device 31.

The operating system 36, in conjunction with the BIOS 19 (FIG. 1) and associated device drivers, provides the basic interface between the computer's resources, the user, and the application programs 37. The operating system 36 interprets and carries out instructions issued by the user. For example, when the user wants to load an application program 37, the operating system 36 interprets the instruction (e.g., double clicking on the application program's icon) and causes the PU 14 to load the program code into RAM 17 from either the local hard disk drive 20, floppy disk 23, CD-ROM 26, or the remote memory storage device 33. Once the application program 37 is loaded into the RAM 17, it is executed by the PU 14. In case of large programs, the PU 14 loads various portions of program modules into RAM 17 as needed.

The operating system 36 provides a variety of functions or services that allow an application program 37 to easily deal with various types of input/output (I/O). This allows the application program 37 to issue relatively simple function calls that cause the operating system 36 to perform the steps required to accomplish various tasks, such as displaying text on the interlaced display device 31 (FIG. 1) or printing text on an attached printer (not shown). Generally described, the application program 37 communicates with the operating system 36 by calling predefined functions provided by the operating system 36. The operating system 36 responds by providing the requested information in a message or by executing the requested task.

The data transmission application program 37a can perform various tasks such as optically transmitting data to a remote device using a display device operating in interlaced mode. The data transmission application program 37a can also be used to order data signals into a lookup table 38 and assign horizontal scan lines of the interlaced display device 31 for these data signals to be transmitted on. The lookup table 38 can be stored in memory, such as RAM 17. The data transmission application program 37a can be used to transmit data signals by illuminating or not illuminating horizontal scan lines to transmit data signals to a remote device 40. The remote device 40 is physically separated from the interlaced display device 31. The remote device 40 includes an optical detector 42. By placing the remote device 40 near and facing the interlaced display device 31, the optical detector 42 receives the data signals as pulses of light from the horizontal scan lines of the interlaced display device 31.

Overview of a Known System for Transmitting Data Using a Non-Interlaced Display Device Systems for transmitting data from a noninterlaced display device to a remote device, such as a wristwatch, are known, as was discussed above. In one such known system, a noninterlaced display device displays a sequence of display frames in which the horizontal scan lines represent individual bits of data. An optical sensor in the remote device receives the serial transmission of data by receiving pulses of light from the horizontal scan lines. Before proceeding with a description of the present invention, a description of this known system for transmitting data using a noninterlaced monitor will be presented below.

Figure 2:
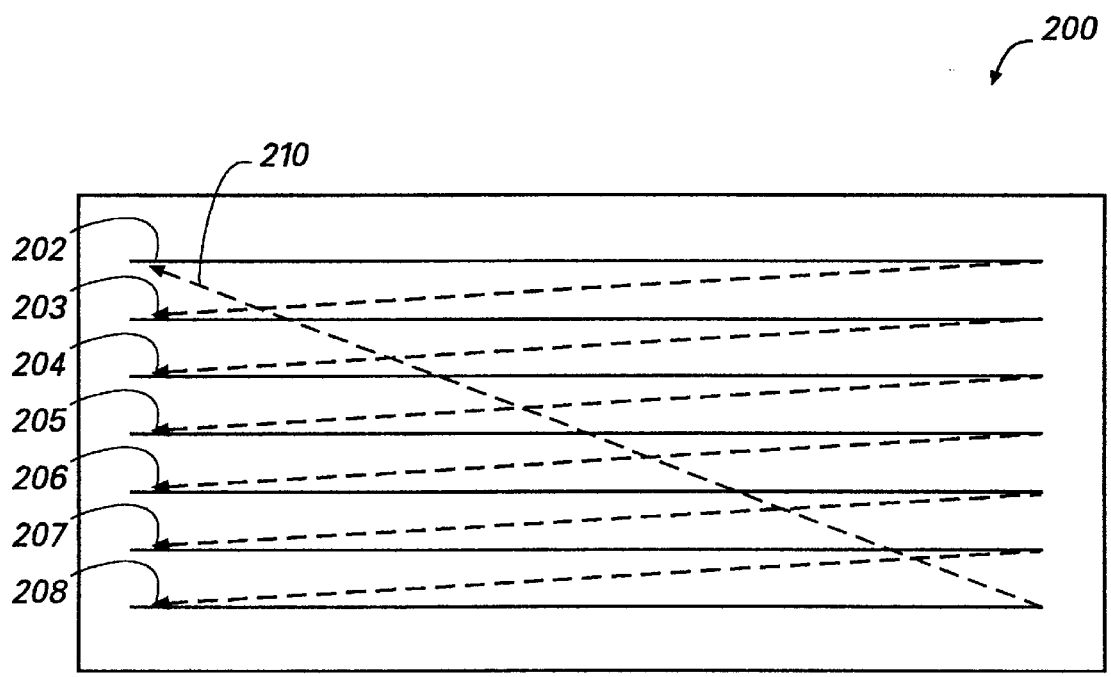
FIG. 2 is an illustration of an electron beam scanning the horizontal scan lines of a noninterlaced display device.

Noninterlaced display devices are well-known in the art. FIG. 2 illustrates a portion 200 of a noninterlaced display device which includes an electron gun and a screen. The electron gun emits an electron beam that illuminates phosphors coating the inside of the screen. The phosphors glow when struck by the electron beam to display an image. Although the phosphors continue to glow briefly after being struck by the electrons, the phosphors must be reactivated by repeated scans of the electron beam for the image to remain stable. The solid scan lines in FIG. 2 are the path that the electron beam scans during a horizontal scan. The noninterlaced display device includes even-numbered horizontal scan lines 202, 204, 206, and 208. The noninterlaced display device further includes odd-numbered horizontal scan lines 203, 205, and 207.

The dashed lines in FIG. 2 represent movement of the electron gun in the noninterlaced display device from the end of one scan line to the beginning of the next scan line. During movement from the end of one scan line to the beginning of the next scan line, the electron gun does not transmit an electron beam to the screen of the noninterlaced display device. Instead, the electron gun refocuses the path of the electron beam to the left edge of the screen at a point just below the previous scan line. At the end of the last horizontal scan line, the electron beam moves to the beginning of the first horizontal scan line.

The movement of the electron gun from the top of the screen to the bottom of the screen and back to the top of the screen constitutes a display frame, a refresh cycle, or a field. Alternatively, movement of the electron gun from the top of the screen to the bottom of the screen is known as generating a raster image. Many noninterlaced display devices have a refresh rate of 60 Hertz. A 60 Hertz noninterlaced display device will refresh, or scan every line of the screen 60 times a second. In other words, a 60 Hertz noninterlaced display device will have 60 refresh cycles or display 60 display frames each second.

In a noninterlaced display device, an electron beam scans each horizontal line of the screen once during each display frame or refresh cycle. Each horizontal scan line is identified by a unique horizontal scan line number. For example, referring to FIG. 2, during each display frame, the electron gun starts at an even-numbered horizontal scan line, even-numbered scan line 202, scans the even-numbered scan line 202, moves to the beginning of an odd-numbered horizontal scan line, odd-numbered scan line 203, scans odd-numbered scan line 203, moves to the beginning of even-numbered scan line 204, scans even-numbered scan line 204, moves to the beginning of odd-numbered scan line 205, scans odd-numbered scan line 205, etc. until each scan line on the screen has been scanned in a consecutive sequence.

After the last scan line is scanned, the electron gun returns to the first scan line at the top left corner of the screen during a vertical blanking interval. The return of the electron gun to the first scan line at the top left corner of the screen during the vertical blanking interval is represented by dashed line 210 in FIG. 2. The above description in reference to FIG. 2 is a basic overview of the manner in which an image is displayed by a noninterlaced display device.

With the basic overview of displaying an image with a noninterlaced display device in mind, a known system for transmitting data using a noninterlaced display device will be described below. Before the data is transmitted by the noninterlaced system, the data is inserted into memory. The noninterlaced display device will illuminate a horizontal scan line (or not illuminate a horizontal scan line) based on the value stored in memory. For example, in order to transmit the binary bitstream 0101010, a lookup table as shown in Table 1 would be constructed. It should be understood that Table 1 is a simplified representation of the memory so that the subject matter can be presented in an uncomplicated manner. The bit value in Table 1 represents whether a binary '1' or '0' should be transmitted. The bit number in Table 1 represents the temporal order of the bits, that is, the serial order of transmission that needs to be maintained for proper temporal reception of the transmitted data signals.

Referring to FIG. 2 and Table 1, scan line 202 is assigned a binary bit value '0', scan line 203 is assigned a binary '1', scan line 204 is assigned a binary '0', scan line 205 is assigned a binary '1', scan line 206 is assigned a binary '0', scan line 207 is assigned a binary '1', and scan line 208 is assigned a binary '0'. As can be seen in FIG. 2 and Table 1, transmission using a noninterlaced display device does not require that the bits be ordered in a special fashion. Instead, the first bit is transmitted on the first horizontal scan line, the second bit is transmitted on the second horizontal scan line, etc.

Table 1

(PRIOR ART)

| Scan Line | Bit Number | Bit Value |
| --- | --- | --- |
| 202 | 1 | 0 |
| 203 | 2 | 1 |
| 204 | 3 | 0 |
| 205 | 4 | 1 |
| 206 | 5 | 0 |
| 207 | 6 | 1 |
| 208 | 7 | 0 |

Using the known noninterlaced display device data transmission method, scan line 202 is illuminated to represent a binary zero. Scan line 203 is not illuminated to represent a binary one. Similarly, scan lines 204–208 are illuminated (or not illuminated) to represent binary zeros (or ones).

Having presented a brief description of a known method for transmitting data using a noninterlaced display device, the method and system of the present invention will be described below.

Transmitting Data Using an Interlaced Display Device in Accordance with the Present Invention The embodiments of the present invention support optical transmission of data to a remote device by using a display device operating in an interlaced mode. Those skilled in the art will recognize that some monitors may be operated in a noninterlaced mode for certain resolutions and in an interlaced mode for certain other resolutions. The term interlaced display device will be used to represent any display device operating in an interlaced mode.

In the preferred embodiment, the interlaced display device is an interlaced raster display device. The data is ordered so that it will be transmitted in the proper temporal order by the interlaced display device and received in the proper temporal order by the remote device. The data is transmitted on both the odd-numbered and even-numbered scan lines of the interlaced display device until all the data has been transmitted. An optical detector, such as a photodiode or phototransistor, in the remote device receives the data.

Figure 3:
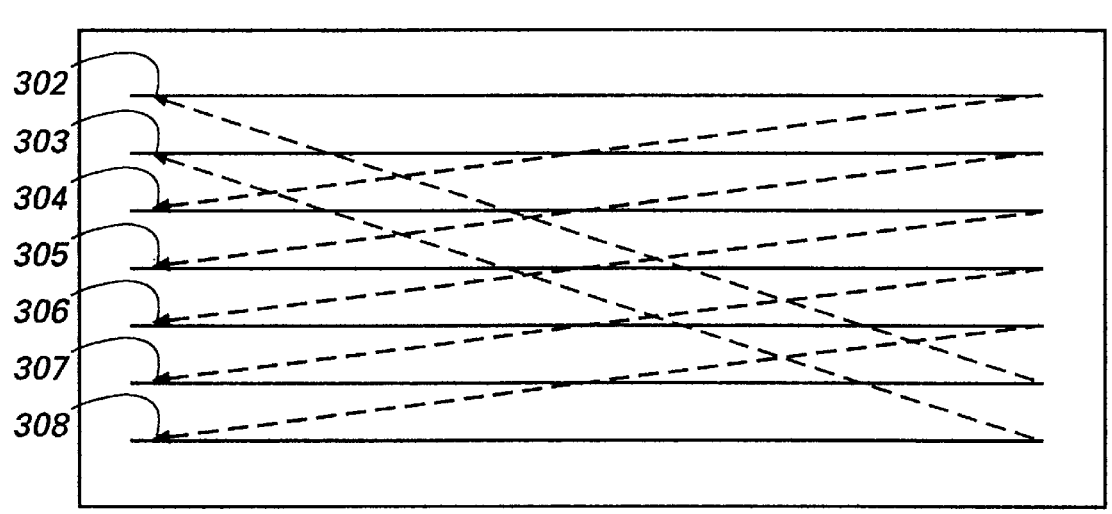
FIG. 3 is an illustration of an electron beam scanning the horizontal scan lines of an interlaced display device.

Before proceeding with a more detailed description of the present invention, a basic overview of an interlaced display device will be presented. Interlaced display devices are well-known in the art. FIG. 3 illustrates a portion 300 of interlaced display device 31 (FIG. 1). The solid lines in FIG. 3 represent horizontal scan lines, each assigned a horizontal scan line number. Interlaced display device 31 includes an electron gun and a screen. As with a noninterlaced display device, the electron gun shoots an electron beam at phosphors coating the inside of the screen. The phosphors glow when struck by the electron beam to display an image. Although the phosphors continue to glow briefly after being struck by the electrons, the phosphors must be reactivated by repeated scans of the electron beam for the image to remain stable. The scan lines are the path that the electron beam from the electron gun scans during a horizontal scan. The interlaced display device 31 includes even-numbered scan lines 302, 304, 306, and 308. The interlaced display device further includes odd-numbered scan lines 303, 305, and 307. Of course, it should be understood that this number of scan lines is for illustration purposes only and that an interlaced display device typically includes many more scan lines than illustrated in FIG. 3.

The dashed lines in FIG. 3 represent movement of the electron gun in the interlaced display device 31 from the end of one scan line to the beginning of the next scan line. During movement from the end of one scan line to the beginning of the next scan line, the electron gun does not transmit an electron beam to the screen of the interlaced display device 31. Instead, for an interlaced display device, the electron gun refocuses the path of the electron beam to the left edge of the screen and skips a scan line.

In an interlaced display device, the electron beam scans every other horizontal scan line of the screen during each display frame. For example, referring to FIG. 3, during one display frame, the electron gun starts at even-numbered scan line 302, scans even-numbered scan line 302, moves to the beginning of even-numbered scan line 304, scans even-numbered scan line 304, moves to the beginning of even-numbered scan line 306, scans even-numbered scan line 306, moves to the beginning of even-numbered scan line 308 and scans even-numbered scan line 308. Thus, all of the even-numbered scan lines are scanned during one display frame.

After all of the even-numbered scan lines are scanned in the display frame, all of the odd-numbered scan lines are scanned in the display frame. For example, referring to FIG. 3, at the end of the scan of even-numbered scan line 308, the electron gun moves to the beginning of odd-numbered scan line 303. The electron gun then scans odd-numbered scan line 303, moves to the beginning of odd-numbered scan line 305, scans odd-numbered scan line 305, moves to the beginning of odd-numbered scan line 307, and scans odd-numbered scan line 307. This process continues until every odd-numbered scan line on the screen has been scanned. After the last odd-numbered scan line has been scanned, the electron gun returns to the beginning of the first even-numbered scan line and the process of scanning the even-numbered scan lines is repeated. The above description is a basic overview of the manner in which an image is displayed by an interlaced display device.

With the basic overview of the operation of an interlaced display device in mind, the preferred embodiment of the present invention will be presented. In the preferred embodiment, data is transmitted by an interlaced display device to a remote device. The remote device includes an optical detector and is physically separated from the interlaced display device. The remote device can be a wristwatch personal information manager or a universal remote control such as would be used with a television, stereo system, videocassette recorder, etc. However, the remote device is not limited to such devices and can include any device with an optical detector that is designed to receive serial data from an interlaced display device.

The interlaced display device preferably transmits the data in binary bits by illuminating a horizontal scan line to represent a binary zero and not illuminating a horizontal scan line to represent a binary one. However, it should be understood that the interlaced display device could transmit the data in binary bits by illuminating a horizontal scan line to represent a binary one and not illuminating a horizontal scan line to represent a binary zero. The remote device is held near the interlaced display device with the optical detector facing the interlaced display device in a manner such that the illumination of the horizontal scan lines is detectable by the optical detector. The optical detector in the remote device receives the data bits as pulses of light from the horizontal scan lines of the interlaced display device.

Figure 4:
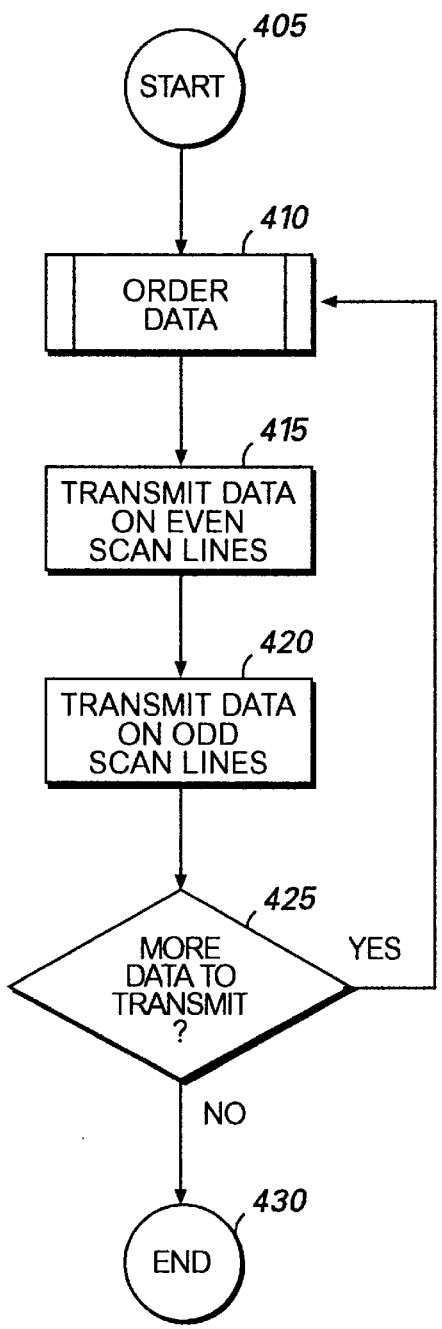
FIG. 4 is a flow diagram illustrating a method for ordering and transmitting data using an interlaced display device in accordance with an embodiment of the present invention.

Referring to FIG. 4, a method 400 for optically transmitting data to a remote device 40 (FIG. 1) using an interlaced display device begins at step 405. Those skilled in the art will appreciate that the method 400 is a computer-implemented process that is carried out in response to input from a user and instructions provided by the data transmission application program 37a (FIG. 1), which is preferably stored in memory such as RAM 17, hard drive 20, or remote memory storage device 33.

The data could be any information that the user is interested in transmitting to the remote device. For example, if the remote device is a wristwatch personal information manager, then the data would probably include dates, numbers, and appointments from a personal information program module running on the computer. As another example, if the remote device is a universal remote control, the data could be codes to program the universal remote control for the user's television, videocassette recorder, etc.

The data intended for transmission is ordered at step 410. Preferably, the data is ordered and stored into a lookup table 38 (FIG. 1) before being transmitted over system bus 18 (FIG. 1) to video memory 32a (FIG. 1). The data needs to be ordered so that it is transmitted in proper temporal order by the interlaced display device 31. A more detailed description of step 410 will be presented below in reference to FIG. 5. After the data is ordered at step 410, data is transmitted on the even-numbered scan lines of the interlaced display device 31 at step 415.

After data is transmitted on the even-numbered scan lines of the display device at step 415, data is transmitted on the odd-numbered scan lines at step 420. After step 420, an inquiry is conducted to determine whether there is any more data to transmit at decision step 425. If there is more data to be transmitted, then more data is ordered at step 410. If there is not any more data to be transmitted, then the method ends at step 430.

Figure 5:
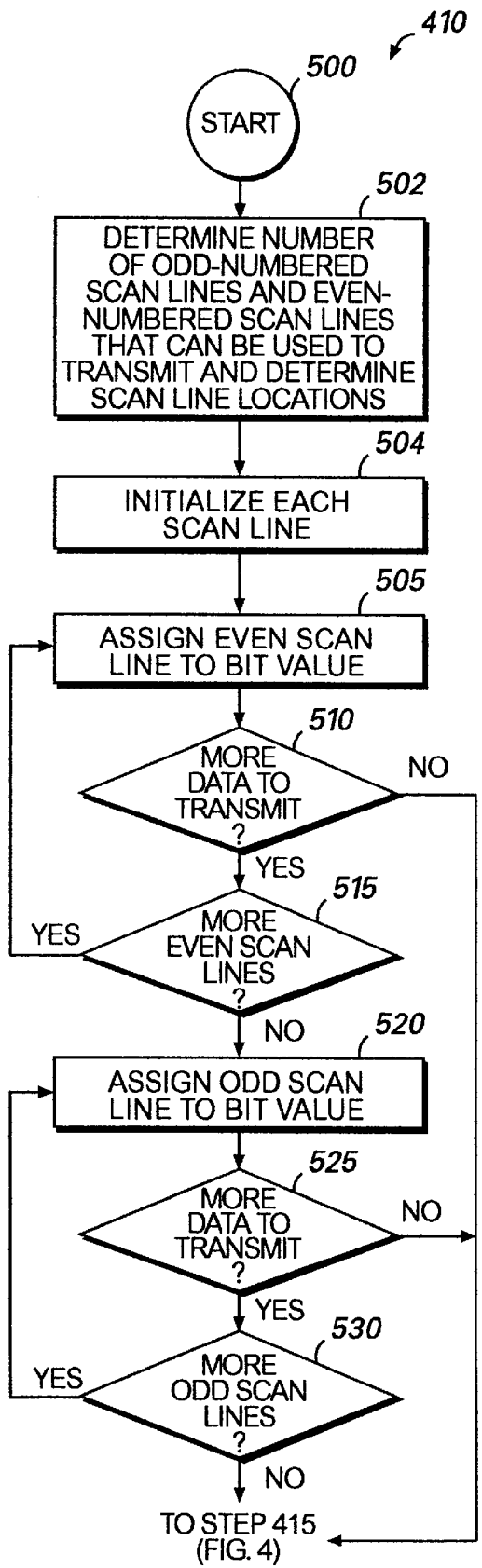
FIG. 5 is a flow diagram illustrating a method for ordering data for transmission using an interlaced display device in accordance with an embodiment of the present invention.

Before the data is transmitted by the interlaced system, the data is ordered at step 410 as described below so that the data is transmitted and received in the proper temporal order. Referring to FIG. 5, the step 410 of ordering data is presented in more detail.

At step 500, the method begins. The number of odd-numbered scan lines that can be used to transmit and the number of even-numbered scan lines that can be used to transmit is determined at step 502. It should be understood that the optical transmission of the present invention preferably does not use every horizontal scan line on the interlaced display device because of possible errors associated with transmission on the upper and lower scan lines of the interlaced display device. There is a usable transmission area that does not include a portion of the top and bottom of the interlaced display device. The usable transmission area depends upon the receiving capabilities of the remote device 40 (FIG. 1), i.e., the optical detector 42 (FIG. 1) in the remote device, and monitor tolerances. Thus, the tasks of ordering and transmitting illustrated by FIGS. 4 and 5 preferably only include scan lines within the usable transmission area of the interlaced display device. In addition, because the usable transmission area may be in the middle of the screen of an interlaced display device, the ordering and transmission may not start at the first scan line at the top of the screen of the interlaced display device. At step 502, the usable transmission area is determined, i.e., the number of odd-numbered scan lines that can be used to transmit, the number of even-numbered scan lines that can be used to transmit and the scan line locations are determined.

At step 504, each even-numbered and odd-numbered scan line is assigned the binary bit value '1', i.e., each scan line is initialized to transmit a binary value of '1'. In the preferred embodiment, a horizontal scan line is not illuminated to represent a binary '1'. Thus, after step 504, none of the scan lines are illuminated in the preferred embodiment.

At step 505, the first even-numbered scan line is assigned the first bit value. After the first even-numbered scan line is assigned a bit value, it is determined whether there is more data to transmit at decision step 510. If there is not any more data to transmit, then the method proceeds to step 415 of FIG. 4 so that the data may be transmitted. If there is more data to transmit, then the method proceeds to step 515.

At decision step 515, it is determined whether there are more even-numbered scan lines that have not been assigned a bit value. Preferably, the number of even-numbered scan lines in the usable transmission area, as determined at step 502, is used to determine whether there is another even-numbered scan line to assign to a bit value. If there are more even-numbered scan lines that have not been assigned a bit value, then the method proceeds to step 505 and the next even-numbered scan line after the first even-numbered scan line is assigned the next bit value after the first bit value. In other words, the process of assigning an even-numbered scan line with a bit value continues until it is determined that there is no more data to transmit or that each even-numbered scan line has been assigned a bit value.

If, at decision step 515, it is determined that each even-numbered scan line has been assigned a bit value, then the method proceeds to step 520. At step 520, the first odd-numbered scan line is assigned the next bit value. After the first odd-numbered scan line is assigned the next bit value, it is determined whether there is more data to transmit at decision step 525. If there is not any more data to transmit, then the method proceeds to step 415 of FIG. 4 so that the data that is assigned the even-numbered and odd-numbered scan lines may be transmitted. If there is more data to transmit, then the method proceeds to decision step 530.

At decision step 530, it is determined whether there are any more odd-numbered scan lines that have not been assigned a bit value. Preferably, the number of odd-numbered scan lines in the usable transmission area, as determined at step 502, is used to determine whether there is another odd-numbered scan line to assign to a bit value. If there are more odd-numbered scan lines that have not been assigned a bit value, then the method proceeds to step 520 and the next odd-numbered scan line after the previous odd-numbered scan line is assigned the next bit value after the previous bit value. If it is determined that there are not any more odd-numbered scan lines at decision step 530, then the method proceeds to step 415, so that the data assigned the even-numbered and odd-numbered scan lines may be transmitted. In other words, the process of assigning an odd-numbered scan line with a bit value continues until it is determined that there is no more data to transmit or that each odd-numbered scan line has been assigned a bit value.

The method of ordering the data as illustrated by FIG. 5 and the method of transmitting the data as illustrated by FIG. 4 can be better understood in the context of the following representative example.

Consider the representative example of transmitting the binary bitstream 0101010. If the first scan line of an interlaced display device is used to transmit the first bit (0), the second scan line is used to transmit the second bit (1), the third scan line is used to transmit the third bit (0), the fourth line is used to transmit the fourth bit (1), the fifth line is used to transmit the fifth bit (0), the sixth line is used to transmit the sixth bit (1), and the seventh line is used to transmit the seventh bit (0) as was previously done for noninterlaced display devices, the bits will be received by the remote device in an improper order. The bits of the bitstream will be received in an improper order because every other line is skipped in displaying an image in an interlaced display device. Thus, the data must be ordered as illustrated in FIG. 5. In the preferred embodiment, this data is ordered into a lookup table such as is illustrated by Table 2. It should be understood that Table 2 is a simplified representation of the memory so that the subject matter can be presented in an uncomplicated manner.

TABLE 2

| Scan Line | Bit Number | Bit Value |
| --- | --- | --- |
| 302 | 1 | 0 |
| 303 | 5 | 0 |
| 304 | 2 | 1 |
| 305 | 6 | 1 |
| 306 | 3 | 0 |
| 307 | 7 | 0 |
| 308 | 4 | 1 |

Referring to FIGS. 4 and 5, the lookup table of Table 2 would be constructed to transmit the binary bitstream 0101010. The scan line in Table 2 represents the horizontal scan line of FIG. 3 that is used to transmit the bit value to the remote device. The bit value in Table 2 represents whether a binary one or zero should be transmitted. The bit number in Table 2 represents the temporal order of the bits, that is, the order in which the bits need to be transmitted. That is, bit number 1 should be transmitted first, bit number 2 should be transmitted second, etc.

Continuing with the example, a step-by-step recitation of the formation of the lookup table will be presented below in reference to FIGS. 4 and 5 and Table 2. At step 500, the method begins. At step 502, the number of odd-numbered scan lines and even-numbered scan lines that can be used to transmit is determined. For purposes of this example, it will be assumed that all horizontal scan lines, 302–308, of FIG. 3 can be used to transmit. Each horizontal scan line, 302–308, is initialized to transmit a binary one at step 504. Preferably, the horizontal scan lines, 302–308, would not be illuminated to represent a binary one.

At step 505, the first even-numbered scan line 302 is assigned the first bit value (0). At step 510, it is determined that there is more data to transmit and, at step 515, it is determined that there are more even-numbered scan lines (304, 306, and 308) to assign bit values.

Returning to step 505, the next even-numbered scan line (304) is assigned the next bit value (1). At step 510, it is determined that there is more data to transmit and, at step 515, it is determined that there are more even-numbered scan lines (306 and 308) to assign bit values.

Returning to step 505, the next even-numbered scan line (306) is assigned the next bit value (0). At step 510, it is determined that there is more data to transmit and, at step 515, it is determined that there are more even-numbered scan lines (308) to assign bit values.

Returning yet again to step 505, the next even-numbered scan line (308) is assigned the next bit value (1). At step 510, it is determined that there is more data to transmit and, at step 515, it is determined that there are no more even-numbered scan lines to assign bit values. Thus, the method proceeds to step 520.

At step 520, the first odd-numbered scan line (303) is assigned the next bit value (0). At step 525, it is determined that there is more data to transmit and, at step 530, it is determined that there are more odd-numbered scan lines (305 and 307) to assign bit values. Thus, the method returns to step 520.

At step 520, the next odd-numbered scan line (305) is assigned the next bit value (1). At step 525, it is determined that there is more data to transmit and, at step 530, it is determined that there are more odd-numbered scan lines (307) to assign with bit values. Thus, the method returns to step 520.

At step 520, the next odd-numbered scan line (307), is assigned the next bit value (0). At step 525, it is determined that there is no more data to transmit and the method proceeds to step 415 of FIG. 4. The data assigned the even-numbered scan lines is transmitted using the interlaced display device 31 based on the lookup table of Table 2. An illuminated scan line preferably represents a binary zero and a non-illuminated scan line preferably represents a binary one. At step 420, the data assigned the odd-numbered scan lines is transmitted using the interlaced display device 31 based on the lookup table of Table 2. At decision step 425, it is determined that there is no more data to transmit and the method ends at step 430. The bit values assigned to the even-numbered scan lines, 302, 304, 306, and 308, are received by the optical detector 42 in the remote device 40; and then the bit values assigned to the odd-numbered scan lines, 303, 305, and 307, are received by the optical detector 42 in the remote device 40 so that the bit values are received in proper temporal order. This concludes the example of ordering and transmitting the binary bitstream 0101010.

It should be understood that, although FIGS. 4 and 5 present the tasks of ordering and transmitting even-numbered scan lines before odd-numbered scan lines, the ordering and transmitting of the scan lines could be reversed depending on the interlaced display device used to implement the method. It should further be understood that, although the preferred embodiment of the present invention includes an interlaced display device operating in response to instructions received from a program module, the present invention can be implemented on any interlaced display device, including, but not limited to televisions.

Although FIG. 4 illustrates data on even-numbered scan lines being transmitted before data on odd-numbered scan lines, it will be further understood that the method works in a similar fashion if the data on the odd-numbered scan lines is transmitted before the data on the even-numbered scan lines. Similarly, the method for ordering illustrated in FIG. 5 may be executed by assigning the odd-numbered scan lines to data signals before assigning the even-numbered data signals to data signals.

The present invention provides a method for optically transmitting data using both the even-numbered and odd-numbered horizontal scan lines of an interlaced display device. In the preferred program, the bits of data to be transmitted are ordered so that the bits are transmitted and received in the proper temporal order. The data bits are transmitted on the even-numbered scan lines and odd-numbered scan lines of the interlaced display device. The present invention also provides a system for ordering data bits to be transmitted.

The present invention provides advantages over prior optical transmission techniques. One advantage is that the data transmission can be accomplished using both the even-numbered and odd-numbered horizontal scan lines of an interlaced display device. Thus, for a certain baud rate, the amount of data which can be transmitted is increased over prior methods.

The present invention has been described in relation to particular embodiments that are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A method for transmitting a temporarily ordered set of data bits from an interlaced display device to a remote device, the interlaced display device alternately displaying images defined by even-numbered scan lines and images defined by odd-numbered scan lines wherein the even-numbered scan lines are spatially interlaced with the odd-numbered scan lines across the images, comprising the steps of:

ordering the data bits such that the data bits will be received temporally by the remote device by alternately assigning temporarily contiguous subsets of the data bits to a usable portion of the even-numbered scan lines and to a usable portion of the odd-numbered scan lines; and alternately displaying the images defined by the even-numbered scan lines and the images defined by odd numbered scan lines to transmit the set of data bits to the remote control device in the temporal order.

2. The method recited in claim 1, wherein the ordering step comprises placing the data bits within a predetermined order in a lookup table that defines an ordered relationship between the scan lines and values of the data bits.

3. The method recited in claim 1, further comprising the step of receiving the data bits with an optical detector of the remote device.

4. The method recited in claim 1, wherein each transmitting step comprises illuminating and not illuminating the scan lines to transmit the data bits.

5. The method recited in claim 1, wherein each transmitting step comprises illuminating certain scan lines to represent a plurality of binary zeros and not illuminating other scan lines to represent a plurality of binary ones.

6. The method as recited in claim 1, wherein the ordering step comprises the step of:

assigning at least one of the even-numbered horizontal scan lines to at least one of the data bits until all the even-numbered horizontal scan lines have been assigned data bits.

7. The method as recited in claim 1, wherein the ordering step further comprises the step of assigning at least one of the odd-numbered horizontal scan lines to at least one of the data bits until all the odd-numbered horizontal scan lines have been assigned data bits.

8. The method as recited in claim 1, wherein the ordering step comprises the steps of:

(iv) assigning at least one of the even-numbered scan lines to one of the data bits;

(v) determining whether there is another data bit to transmit;

(vi) if there is another data bit to transmit, determining whether there is another even-numbered scan line that has not been assigned to one of the data bits;

(vii) if there is another even-numbered scan line that has not been assigned to one of the data bits, then repeating steps (iv)–(vi);

if there is not another even-numbered scan line that has not been assigned to one of the data bits, then (viii) assigning at least one of the odd-numbered scan lines to one of the data bits;

(ix) determining whether there is another data bit to transmit;

(x) if there is another data bit to transmit, determining whether there is another odd-numbered scan line that has not been assigned to one of the data bits; and (xi) if there is another odd-numbered scan line that has not been assigned to one of the data bits, then repeating steps (viii)–(x).

9. The method recited in claim 1, further comprising the step of repeating steps (i)–(iii) until each of the data bits has been transmitted.

10. The method recited in claim 1 wherein said transmitting steps comprise transmitting by using scan lines within a usable transmission area of the interlaced display device.

11. A computer storage medium storing computer-executable instructions for performing the method of claim 1.

12. A computer-controlled device operable for performing the method of claim 1.

13. A computer system for transmitting data signals to a remote device, comprising:

a processing unit (PU);

an interlaced display device coupled to the processing unit (PU) comprising even-numbered scan lines and odd-numbered scan lines, the interlaced display device alternately displaying images defined by the even-numbered scan lines and images defined by the odd-numbered scan lines wherein the even-numbered scan lines are spatially interlaced with the odd-numbered scan lines across the images; and memory, coupled to the PU, for storing a program module;

the PU, responsive to instructions from the program module, being operative to:

order the data signals by alternately assigning temporarily contiguous subsets of the data bits to a usable portion of the even-numbered scan lines and to a usable portion of the odd-numbered scan lines; and alternately cause the display device to display the images defined by the even-numbered scan lines and the images defined by odd-numbered scan lines to transmit the set of data bits to the remote control device in the temporal order.

14. The system recited in claim 13, wherein the data signals are ordered in a lookup table.

15. The system recited in claim 13, wherein, to order the data signals, the PU is operative to:

(i) assign at least one of the even-numbered 5 scan lines to one of the data signals;

(ii) determine whether there is another data signal intended for transmission;

(iii) if there is another data signal intended for transmission, determine whether there is another even numbered scan line that has not been assigned to one of the data signals;

(iv) if there is another even-numbered scan line that has not been assigned to one of the data signals, then repeat steps (i)–(iv);

if there is not another even-numbered scan line that has not been assigned to one of the data signals, then (v) assign at least one of the odd-numbered scan lines to one of the data signals;

(vi) determine whether there is another data signal intended for transmission;

(vii) if there is another data signal intended for transmission, determine whether there is another odd numbered scan line that has not been assigned to one of the data signals, and (viii) if there is another odd-numbered scan line that has not been assigned to one of the data signals, then repeat steps (v)–(vii).

16. The system recited in claim 13, wherein to transmit data signals, said PU is further operative to:

illuminate certain scan lines to represent a first value of the data signals and not illuminate other scan lines to represent a second value of the data signals.

17. A computer-readable medium on which is stored a computer program for transmitting a temporarily ordered set of data bits from an interlaced display device to a remote device, the interlaced display device alternately displaying images defined by even-numbered scan lines and images defined by odd-numbered scan lines wherein the even-numbered scan lines are spatially interlaced with the odd-numbered scan lines across the images, the computer program comprising instructions which, when executed by a computer, perform the steps of:

ordering the data bits such that the data bits will be received temporally the remote device by alternately assigning temporarily contiguous subsets of the data bits to a usable portion of the even-numbered scan lines and to a usable portion of the odd-numbered scan lines; and alternately displaying the images defined by the even-numbered scan lines and the images defined by odd-numbered scan lines to transmit the set of data bits to the remote control device in the temporal order.

18. The computer-readable medium recited in claim 15, wherein the step of ordering comprises the steps of:

assigning the even-numbered horizontal scan lines to at least one of the data signals; and assigning the odd-numbered horizontal scan lines to at least one of the data signals.

19. The computer-readable medium recited in claim 17, wherein the steps of transmitting data signals comprise:

illuminating certain scan lines to represent a first value of the data signals and not illuminating other scan lines to represent a second value of the data signals.

20. In an optical transmission system for transmitting data to a remote device, said optical transmission system comprising an interlaced display device with even numbered scan lines and odd-numbered scan lines, a method for ordering data so that the data is received in the proper temporal order by the remote device, comprising the steps of;

(i) assigning at least one of the even numbered scan lines to one of the data bits;

(ii) determining whether there is another data bit to assign;

(iii) if there is another data bit to assign, determining whether there is another even-numbered scan line that has not been assigned to one of the data bits;

(iv) if there is another even-numbered scan line that has not been assigned to one of the data bits, then repeating steps (i)–(iii);

if there is not another even-numbered scan line that has not been assigned to one of the data bits, then (v) assigning at least one of the odd numbered scan lines to one of the data bits;

(vi) determining whether there is another data bit to assign;

(vii) if there is another data bit to assign, determining whether there is another odd-numbered scan line that has not been assigned to one of the data bits; and (viii) if there is another odd-numbered scan line that has not been assigned to one of the data bits, then repeating steps (v)–(vi).

* * * * *